United States Patent
Bell et al.

(10) Patent No.: US 9,530,342 B2
(45) Date of Patent: Dec. 27, 2016

(54) AMBIENT LIGHT CONTEXT-AWARE DISPLAY

(71) Applicant: Microsoft Technology Licensing, LLC, Redmond, WA (US)

(72) Inventors: Cynthia Sue Bell, Kirkland, WA (US); Kevin Woo, Bellevue, WA (US); Philip L. Barnes, Seattle, WA (US); Steven C. Glenner, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/023,326

(22) Filed: Sep. 10, 2013

(65) Prior Publication Data

US 2015/0070337 A1   Mar. 12, 2015

(51) Int. Cl.
G09G 3/20 (2006.01)
(52) U.S. Cl.
CPC .... *G09G 3/2003* (2013.01); *G09G 2320/0242* (2013.01); *G09G 2320/0626* (2013.01); *G09G 2320/0653* (2013.01); *G09G 2320/0666* (2013.01); *G09G 2320/0673* (2013.01); *G09G 2340/06* (2013.01); *G09G 2360/144* (2013.01)

(58) Field of Classification Search
CPC combination set(s) only.
See application file for complete search history.

(56) References Cited

U.S. PATENT DOCUMENTS

| | | | |
|---|---|---|---|
| 3,961,361 A | 6/1976 | Avins et al. | |
| 4,090,216 A | 5/1978 | Constable | |
| 7,236,154 B1 | 6/2007 | Kerr et al. | |
| 8,026,908 B2 | 9/2011 | Ku et al. | |
| 8,159,616 B2 | 4/2012 | Norgaard | |
| 8,282,261 B2 | 10/2012 | Pance et al. | |
| 8,324,830 B2 | 12/2012 | Peker et al. | |

(Continued)

FOREIGN PATENT DOCUMENTS

| | | |
|---|---|---|
| EP | 1187086 A2 | 3/2002 |
| EP | 1361563 A2 | 11/2003 |

(Continued)

OTHER PUBLICATIONS

ISA European Patent Office, International Search Report and Written Opinion of PCT/US2014/054168, Feb. 6, 2015, 26 Pages.

*Primary Examiner* — Nalini Mummalaneni
*Assistant Examiner* — Robert Michaud
(74) *Attorney, Agent, or Firm* — Judy Yee; Micky Minhas

(57) ABSTRACT

Embodiments are disclosed that relate to modifying a display of a portable electronic device to account for ambient light. For example, one disclosed embodiment provides a method comprising determining an ambient light history including a plurality of ambient light color conditions sensed over a duration of device operation by an ambient light sensor, reading a display-ready image having a plurality of pixels from an image source, adjusting a manner in which the display-ready image is displayed by color-shifting at least a subset of the plurality of pixels based on the plurality of ambient light color conditions in the ambient light history to thereby generate a color-modified image, and displaying the color-modified image on the display of the portable electronic device.

18 Claims, 10 Drawing Sheets

(56) References Cited

U.S. PATENT DOCUMENTS

| | | | |
|---|---|---|---|
| 8,358,273 B2 | 1/2013 | Hodge et al. | |
| 2006/0132424 A1 | 6/2006 | Foo et al. | |
| 2007/0081102 A1 | 4/2007 | Ramanath et al. | |
| 2008/0055297 A1 | 3/2008 | Park | |
| 2008/0303918 A1* | 12/2008 | Keithley | G09G 3/20 348/223.1 |
| 2009/0012841 A1* | 1/2009 | Saft | G06Q 30/02 705/7.29 |
| 2010/0033457 A1 | 2/2010 | Kim et al. | |
| 2010/0165002 A1 | 7/2010 | Ahn | |
| 2011/0050663 A1 | 3/2011 | Katahira | |
| 2011/0141159 A1 | 6/2011 | Takeuchi | |
| 2011/0175925 A1* | 7/2011 | Kane | G01J 1/42 345/589 |
| 2012/0133790 A1* | 5/2012 | Sams | G06T 15/60 348/222.1 |
| 2012/0212467 A1* | 8/2012 | Kohtoku | G02F 1/1354 345/207 |
| 2012/0320014 A1 | 12/2012 | Longhurst et al. | |
| 2013/0038790 A1 | 2/2013 | Seetzen et al. | |
| 2013/0069924 A1* | 3/2013 | Robinson | G09G 3/20 345/207 |
| 2013/0120656 A1 | 5/2013 | Wilson et al. | |

FOREIGN PATENT DOCUMENTS

| | | | |
|---|---|---|---|
| EP | 1874048 A1 | 1/2008 | |
| EP | 2372680 A2 | 10/2011 | |
| WO | 9418790 A1 | 8/1994 | |
| WO | 2005104081 A1 | 11/2005 | |

* cited by examiner

MIDDAY LIGHT   FLUORESCENT LIGHT   EVENING LIGHT

AMBIENT LIGHT CONTEXT-AWARE DISPLAY

BACKGROUND

Portable electronic devices are used in a multitude of ambient light conditions, which can significantly affect a user's perception of the displayed content on such devices. The human vision system has some ability to adapt to these different ambient lighting conditions. However, even with these adaptive abilities, in different ambient light conditions a user will perceive the display differently, and in some ambient light conditions the user's perception of the display will be degraded. For example, in bright ambient light a dim display may be hard to see.

One mobile phone device that attempts to address this issue uses an ambient light detector to measure a current brightness level of the ambient light. The mobile phone then bins the current brightness level into one of a plurality of brightness ranges, and adjusts a backlight brightness value for the display based on the ambient brightness range in which the detected current ambient brightness level falls. This prior approach has the advantages of improving the display visibility based on the detected current brightness of the ambient light, and saving battery power when a fully bright display is not required.

However, one drawback of such devices is that since the display brightness is adjusted based on a current ambient brightness level, when a user travels from a bright environment to a dark one, or vice versa, the display may be either too bright or too dim for the user, because the user's eyes have not yet adjusted to the new ambient light environment. Another drawback is that the user's perception of the color of the display may be degraded by the color of ambient light. For example, a user viewing a display in tungsten light may perceive a display's colors to be shifted toward a blue region of the color spectrum as compared to when viewing the same display in daylight. Similarly, a user viewing a display in the light of early morning or late evening, which has a different color profile than midday light, may perceive the colors of the display as altered as compared to midday.

According to another prior approach, a geographic location is entered into a software program on a computing device, along with a type of night time light source. The software program calculates a preset twenty four hour color shift curve. The software program then proceeds to shift the color of the display according to the preset twenty four hour color shift curve throughout the day and night. While such an approach attempts to adjust the display to a color that is closer to the daylight or night time light source by which the user views the device, the approach nonetheless suffers from the drawback that the color shifting curve is preset and as a result differences between the actual ambient light conditions and the display as modified by the color shifting curve often and inevitably result. These differences can cause the display to appear to be too red or too yellow, for example, resulting in a sub-optimal display viewing experience.

As a result of these wide variances in user perception of displayed images in different ambient light conditions, the user's experience with the portable electronic device may be degraded, potentially frustrating both the user, and the sales of the portable electronic device.

SUMMARY

To address these issues, systems and methods for adjusting a display to account for ambient light are provided. For example, one disclosed embodiment provides a method comprising, at a portable electronic device, determining an ambient light history including a plurality of ambient light color conditions sensed over a duration of device operation by a light sensor, reading a display-ready image having a plurality of pixels from an image source, and adjusting a manner in which the display-ready image is displayed on the portable electronic device by color-shifting at least a subset of the plurality of pixels based on the plurality of ambient light color conditions in the ambient light history to thereby generate a color-modified image. The color-modified image is then displayed on the display of the portable electronic device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figures 1, 2:
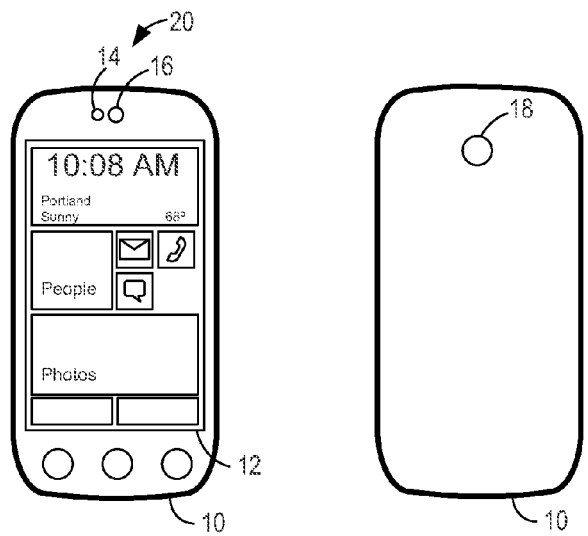
FIG. 1 shows an example of a portable electronic device having a display which may be modified to account for ambient light.
FIG. 2 shows a rear side of the portable electronic device of FIG. 1.

FIGS. 1 and 2 illustrate one embodiment of a portable electronic device 10 with a display 12 configured to adapt its output based upon a history of ambient light conditions to enhance the perception of the display by a user. Although a smartphone is depicted, it will be appreciated that the portable electronic device 10 may be of other types, including a tablet computing device, laptop computer, personal data assistant, etc. The internal hardware configuration of portable electronic device 10 is described in more detail below with reference to FIG. 13.

Along with display 12, portable electronic device 10 includes an ambient light sensor 14 and a front camera 16 disposed on a front side of the device, as shown in FIG. 1, and a rear camera 18 disposed on a rear side of the device, as shown in FIG. 2. The front camera 16, rear camera 18, and ambient light sensor 14 constitute a plurality of light sensors 20 provisioned on the portable electronic device 10, which can be used to provide information about the ambient light conditions in the surrounding environment to the device. Ambient light sensor 14 typically is a small group of photodetectors with optical filtering that is configured to sense both luminance and also a color condition such as a correlated color temperature (CCT) of the detected ambient light. Front camera 16 and rear camera 18 may be any suitable type of camera, and may include a CMOS and/or CCD light sensor. Images captured by front and rear cameras 16 and 18 may be analyzed to determine the ambient light conditions surrounding the display 12 upon capture. To accomplish this, software and/or hardware logic may be utilized to determine the luminance and also correlated color temperature of the images captured by front camera 16 and rear camera 18. It will be appreciated that other light characteristics may also be determined through an analysis of the images captured by front and rear cameras 16 and 18, and through analysis of data captured by ambient light sensor 14. Light characteristics determined via analysis of such data may be used to adjust the color properties (e.g., white point) of a displayed image on the display 12.

Figure 3:
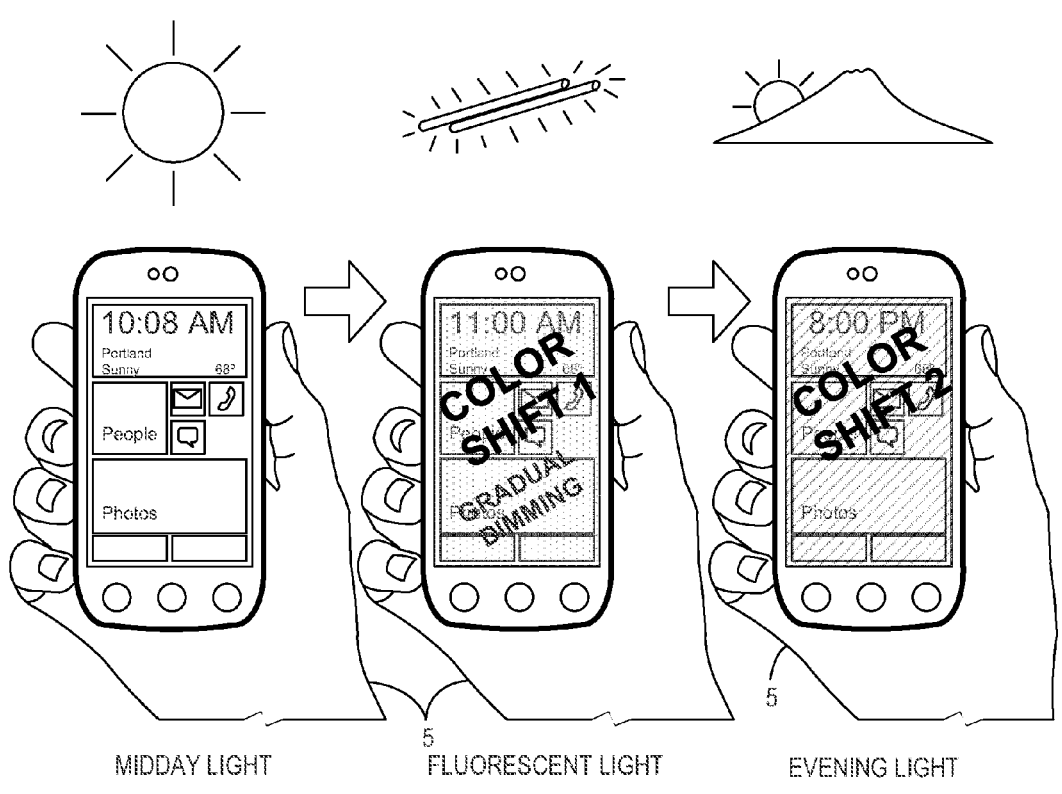
FIG. 3 shows examples of adjusting the display of the portable electronic device of FIG. 1 to account for ambient light.

As schematically illustrated in FIG. 3, portable electronic device 10 can be picked up by a user 5 and carried into a wide variety of ambient lighting conditions, such as midday sunlight, fluorescent lighting, and evening sunlight, to name a few. To overcome the challenges discussed in the Background above, and to generally enhance the user's perception of the display 12 of the portable electronic device 10, the portable electronic device of the present disclosure is configured to detect a history of the color conditions (such as correlated color temperatures) and luminance of the ambient light via the light sensors 20 discussed above, and make appropriate modifications to the image presented on the display and/or the display itself. As described in more detail below, these modifications may include adjusting color properties of the image itself (e.g., white point, color rendering, and peak luminance), and/or adjusting one or more settings of the display itself (e.g. display gamma and backlight level). In FIG. 3, the portable electronic device 10 is illustrated making two ambient light transitions. In the first, after a sudden transition from bright midday sunlight to dim fluorescent light, the device 10 applies a first color shift to display warmer (e.g., having a white point substantially of 3500K) colors and a gradual dimming profile which gradually dims the brightness of display 12 to a brightness appropriate for the brightness of the ambient light. In the second, after a transition from the dim fluorescent light to a slightly brighter warm evening sunlight, the device 10 applies a second color shift to display increasingly warmer (e.g., having a white point substantially of 2500K) colors to match the evening sunlight.

Figure 4:
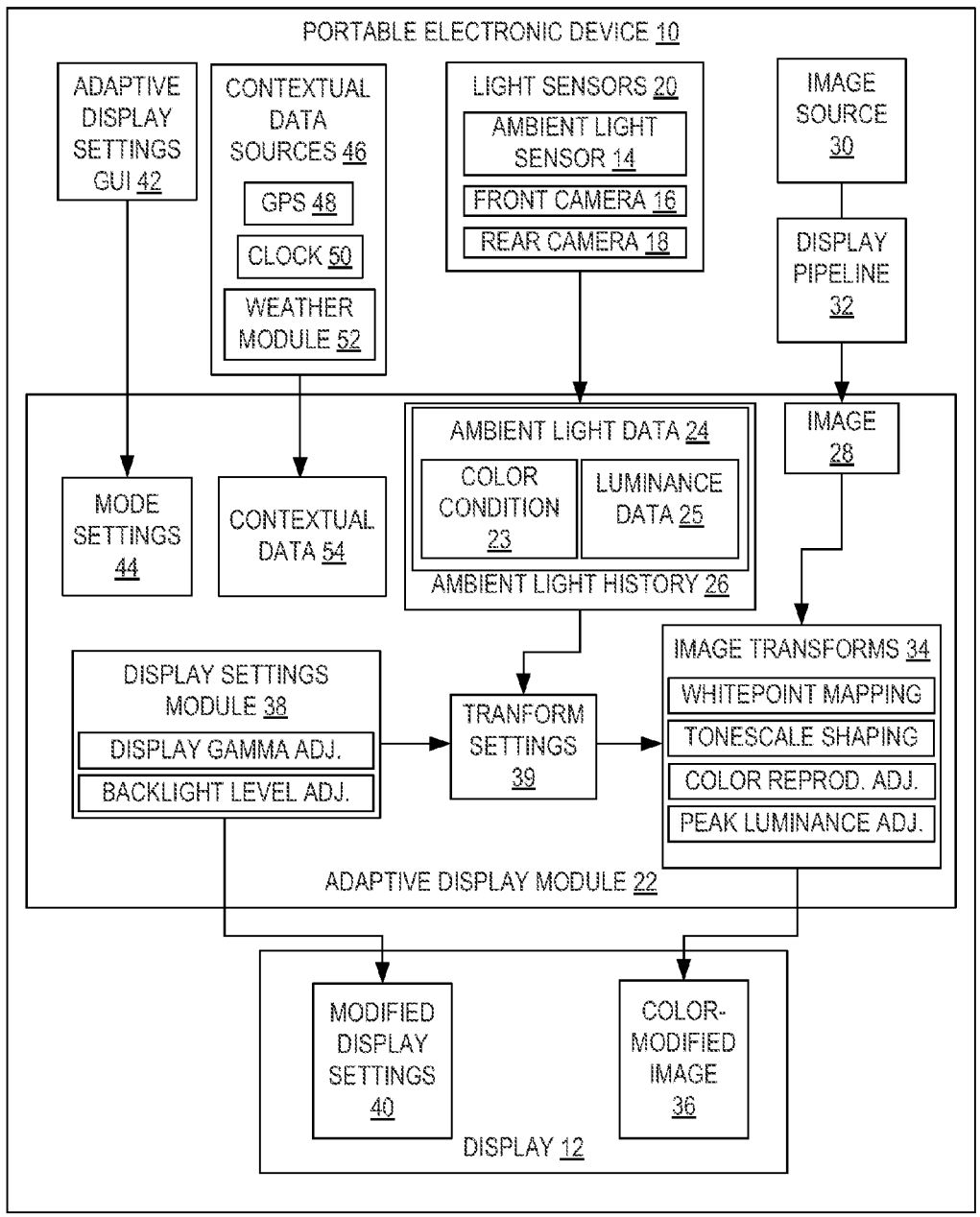
FIG. 4 schematically shows a system for adjusting the display of the portable electronic device of FIG. 1 to account for ambient light.
Figure 7:
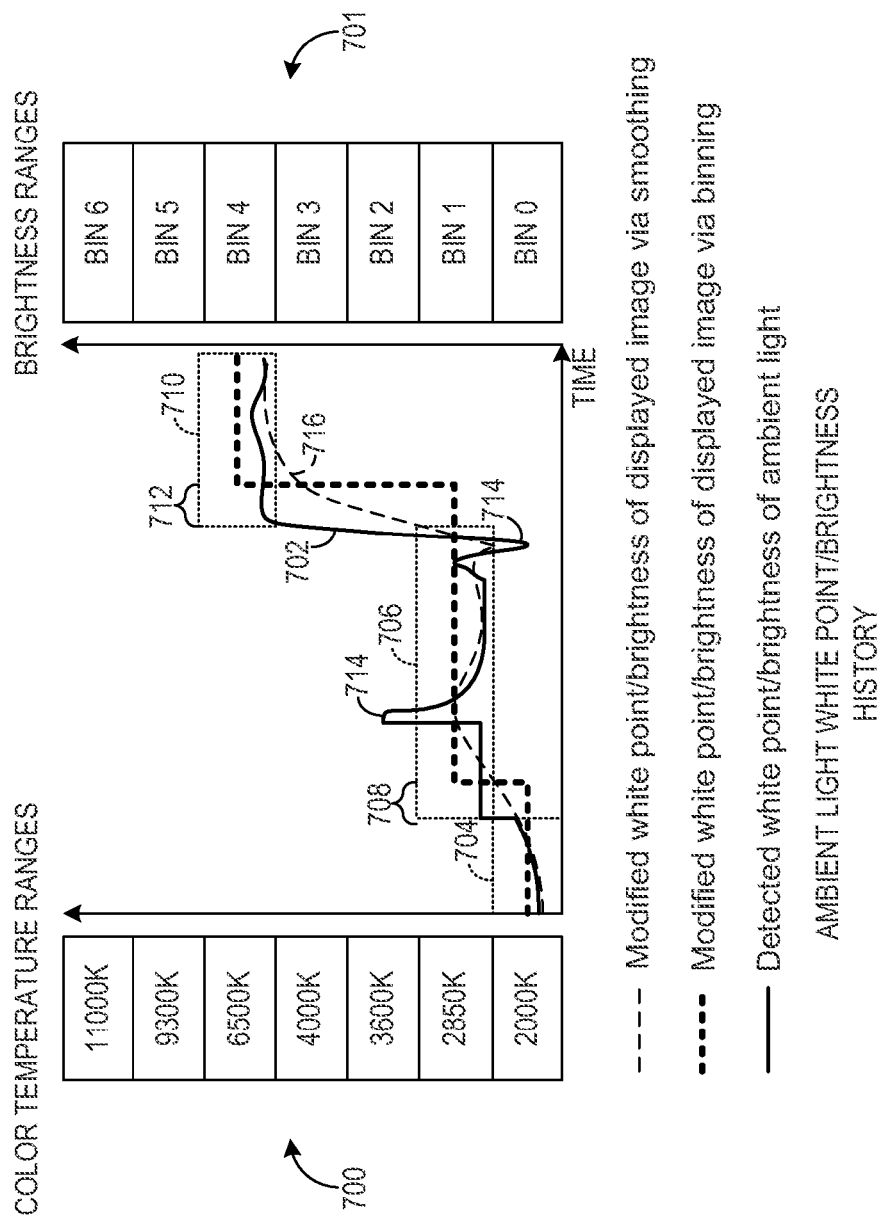
FIG. 7 schematically shows an example of adjusting the white point and brightness of the display of the portable electronic device of FIG. 1 to account for ambient light.

Turning now to FIG. 4, to achieve this adaptive display functionality, portable electronic device 10 includes an adaptive display module 22 configured to receive ambient light data 24 from at least one of the light sensors 20. The ambient light data 24 includes an indication of the brightness and color of ambient light surrounding device 10 sensed by light sensors 20, encoded respectively in luminance data 25 and ambient light color condition 23. The ambient light color condition 23 may indicate the white point of ambient light in the form of a CCT, for example. The ambient light data 24 is collected over a duration of operation of the device 10 and stored in an ambient light history 26, and may be collected in a substantially continuous manner or as a plurality of discrete data samples at intervals throughout the duration of device operation. One example of an ambient light history is illustrated in FIG. 7, discussed below in greater detail. In some embodiments, changes in ambient brightness above a threshold level are stored while those below the threshold level are discarded. Elapsed times or timestamps may be associated with ambient brightness measurements. These are especially useful for measurements straddling a brightness threshold change to facilitate adaptive display modification.

Once the ambient light history 26 is thus determined, the adaptive display module 22 is configured to receive a display-ready image 28 from an image source 30, such as a program executed on the portable electronic device, a file store storing images captured via front and/or rear cameras 16 and 18 or obtained elsewhere, etc. The image 28 is passed through a display pipeline 32 of an operating system running on the portable electronic device 10 to facilitate rendering of the image on the display 12. As one example, the display-ready image illustrated in FIGS. 1-2 is of a GUI generated by the operating system. As another example, the display-ready image may be an image or one of a sequence of images forming a video file. In either case, the display-ready image is typically encoded in a format such as JPEG, with display-ready video comprising display-ready images being typically encoded in a format such as MPEG. Being so encoded, it will be appreciated that the display-ready image 28 is comprised of a plurality of individual pixels, and typically is generated to have a white point of approximately 6500K based on illuminant D65, which is also the white point defined in ITU-R Recommendation BT.709 for use in high definition television. The display-ready image generally is configured to occupy substantially an entire area of the display 12, although other sizes are also possible. Hereinafter display-ready image 28 will be simply referred to as image 28.

The adaptive display module 22 of portable electronic device 10 further includes an image transform module 34, which is configured to adjust display 12 of the portable electronic device by color-shifting at least a subset of the plurality of pixels of the image 28 based on the plurality of ambient light color conditions in the ambient light history, thereby generating a color-modified image 36. Pixels may be further adjusted based on the luminance data in the ambient light history and on display settings of display 12 described below. As examples, the color and brightness of at least a subset of the pixels in the display-ready image may be modified. In some examples, all or substantially all of the pixels in the display-ready image are modified to produce color-modified image 36.

Figure 12:
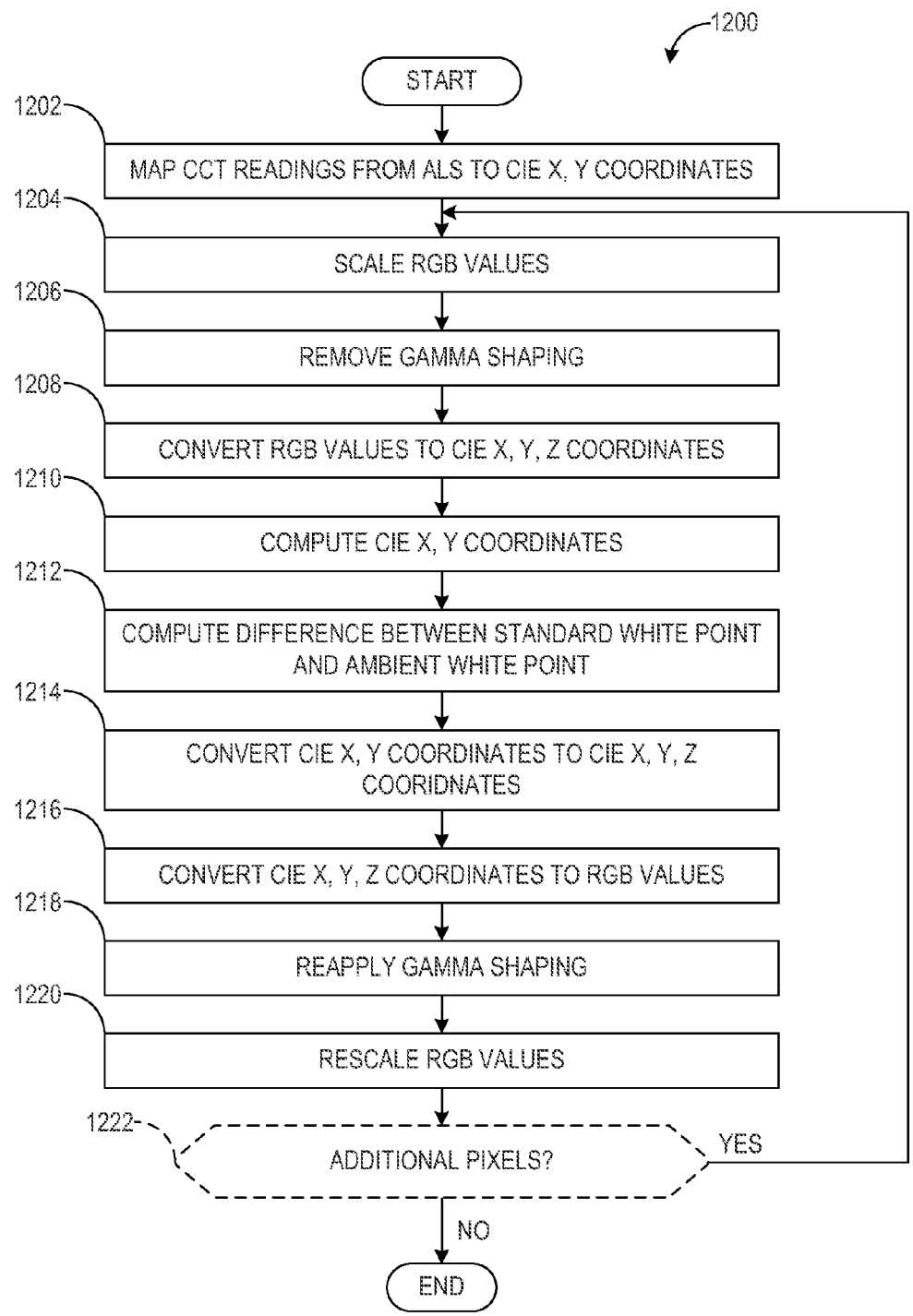
FIG. 12 shows a flowchart illustrating a method for adjusting the white point of the display of the portable electronic device of FIG. 1 to account for ambient light.

The image transform module 34 may include a white point mapping tool, a tonescale shaping tool, a color reproduction adjusting tool, and a peak luminance adjusting tool. These tools are respectively configured to programmatically adjust the white point, tonescale, color reproduction, and peak luminance of the display-ready image 28, to thereby generate color-modified image 36. An example flowchart illustrating the functions of the white point mapping tool is illustrated at FIG. 12.

The adaptive display module 22 further includes a display settings module 38, configured to generate transform settings 39 based on a plurality of brightness conditions and/or ambient light color conditions recorded in the ambient light history 26, and further based on settings of display 12 including display gamma adjustments and backlight level adjustments. As transform settings 39 are based upon data regarding ambient light conditions and display adjustments, the transform settings prescribe all changes that are implemented in image transforms 34 including changes in display white point, tonescale, color reproduction, and peak luminance. It can be readily appreciated that for display technologies that are self-emissive, operations such as the backlight level adjustment will have correlates to adjust the emission level and hence the luminance of the displayed image.

The adaptive display module 22 passes the color modified image 36 to the display 12, which displays the color-modified image. Modified display settings 40 may be further passed to the display from display settings module 38, and may include adjustments specific to display 12, such as display gamma adjustments and backlight level adjustments. In other embodiments, however, modified display settings 40 may be bundled with the data associated with color-modified image 36 and passed to display 12 from image transforms 34.

Figure 5:
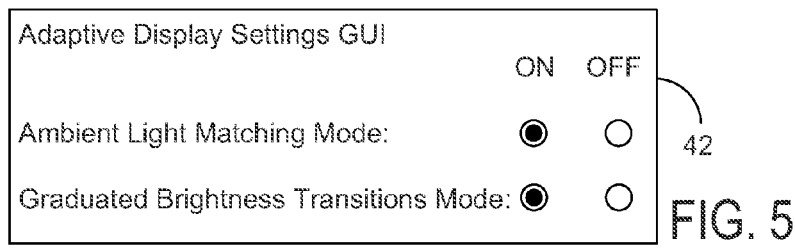
FIG. 5 shows an exemplary graphical user interface for controlling the display of the portable electronic device of FIG. 1 to account for ambient light.

To enable the user to turn on or off the various types of ambient light adjustment provided by the portable electronic device 10, the portable computing device 10 may include an adaptive display settings graphical user interface (GUI) 42 configured to receive user input in the form of mode settings 44. FIG. 5, discussed below, shows one example of the adaptive display settings GUI 42, with example modes of operation listed therein.

The portable computing device 10 may further include one or more contextual data sources 46, such as a global positioning satellite (GPS) unit 48, clock 50, and weather module 52. The GPS unit 48 may output one or more of a latitude, longitude, and altitude of the portable computing device. The clock 50 reports the current time and date, while the weather module 52 may estimate typical lighting conditions associated with the current weather proximate the portable computing device. These contextual data sources 46 provide contextual data 54 to the adaptive display module 22, facilitating display and/or image modification in a manner adaptive to the ambient light conditions surrounding the portable computing device, even in scenarios in which output from the ambient light sensor 14, front camera 16, and rear camera 18 is unavailable.

It will be appreciated that, in some embodiments, content properties of the image 28 to be adjusted are received by the adaptive display module 22. The content properties may include the pixel values of the image including a color value associated with each pixel. The color values may be encoded as RGB values, for example. As one non-limiting example in which the content properties of the image are utilized to produce color-modified image 36, an image dominated by dark tones may be mapped through a different gamma table set for outdoor ambient light conditions than for indoor ambient light conditions. An outdoor gamma table may boost the luminance of darker tones in proportion to the estimated ambient brightness so that they are visible over the ambient glare on the surface of the display.

Turning now to FIG. 5, an example of adaptive display settings 42 is illustrated. As shown, the user may choose to turn on or off an ambient light matching mode and a graduated brightness transitions mode. These settings are saved as mode settings 44, discussed above. In the ambient light matching mode, the adaptive display module 22 adjusts the display 12 to match the typical user's visual adaptation state in response to the color condition of ambient light recorded in ambient light data 22. The display may be adjusted to match the white point and brightness of the ambient light, for example. In the graduated brightness transitions mode, the adaptive display module applies a dim adjust profile and a brightness adjust profile to gradually transition the brightness level of the display in a manner that accommodates the physiology of a typical user's eyes and their particular ambient light history. The application of these modes will be described in more detail below. It will be appreciated that the adjustment of the display 12 by the ambient light matching and graduated brightness transitions modes may include modification of images (e.g., image 28) displayed thereon.

While three light sensors are depicted in FIG. 4, in some embodiments only the ambient light sensor 14 is used, while in others only a single camera is used, and in still others, only a combination of the front and rear cameras 16, 18 are used to sense ambient light. The brightness and white point of the ambient light sensed by the ambient light sensor 14 and/or front and/or rear cameras 16 and 18 may be combined, for example averaged, to account for variations in the measurement due to the position of each such light sensor on the device 10. Ambient light sensors (ALS) such as those made by INTERSIL, MAXXIM, AVAGO, and TAOS INC. are widely used to assess ambient brightness for a mobile device (e.g. digital cameras, phones, tablets). Some of these devices also include circuitry and color filtered pixels that combine to estimate the ambient correlated color temperature (CCT). In embodiments in which data is captured from both front and rear cameras 16 and 18, various routines may be applied to appropriately combine or blend such data, including averaging and leveraging output from an accelerometer in the portable electronic device 10 to apply greater weighting to the camera facing the user, for example.

Figure 6:
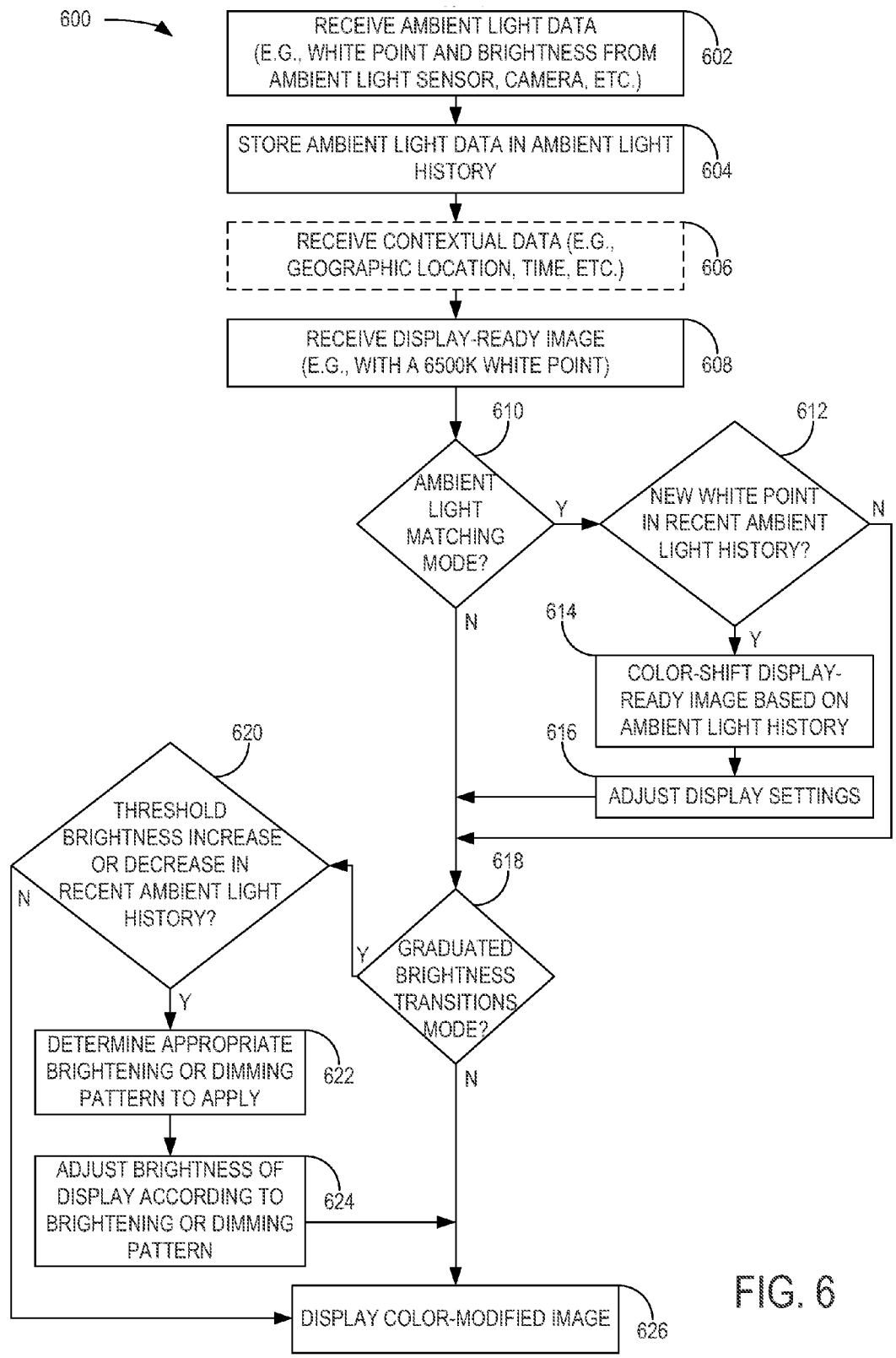
FIG. 6 shows a flowchart illustrating a method for controlling the display of the portable electronic device of FIG. 1 to account for ambient light.

Turning now to FIG. 6, a flowchart illustrating an exemplary method 600 by which a display and an image displayed thereon may be adjusted to account for ambient light surrounding the display is shown. Although method 600 is described as being implemented on device 10 of FIG. 1, it will be appreciated that the method may be executed on other suitable hardware.

At 602, ambient light data is received, which may include an ambient light color condition indicating the ambient white point (e.g., represented by a CCT) and brightness. The ambient light data may be obtained substantially continuously or sampled at intervals during the duration of operation of device 10 as described above, and may be received from a light sensor such as an ambient light sensor, front camera, and or rear camera.

In one additional embodiment, the ambient light data may be derived from images of the face of user 5 of FIG. 3. For example, front camera 16 of FIG. 1 may capture one or more images whose contents may be analyzed to detect the face of user 5. Regions of the captured image(s) surrounding the detected face may then be analyzed to determine an estimate of ambient light conditions (e.g., white point). The image may be analyzed to determine a pair of color chromaticity coordinates associated with the user's face. Since skin tones from all races map into a narrow chromaticity range, the deviation from typical skin tone can be inferred to be a result of the present lighting conditions. A sample chromaticity centroid for skin tones is CIE x,y [0.400, 0.370].

Next, at 604, the ambient light data is stored in an ambient light history in memory or on a mass storage device of the portable electronic device. An example of ambient light history is illustrated in FIG. 7. The ambient light data may include indications of the color condition (e.g., white point) and brightness of ambient light surrounding the portable electronic device, encoded respectively in color condition 23 and luminance data 25 of FIG. 4, for example.

Next, at 606, contextual data may be optionally received. The contextual data may be leveraged most in embodiments in which ambient light data from one or more of an ambient light sensor, front camera, and rear camera is unavailable. The contextual data may include an indication of the geographic location of the portable electronic device, the current time and date, and typical lighting conditions associated with the current weather proximate the portable electronic device. Such data may be respectively provided via GPS unit 48, clock 50, and weather module 52 of FIG. 4, for example. The contextual data may be used to compute an estimated white point of ambient light at the time and date indicated by clock 50, at the location detected by the GPS unit 48 on the device, and/or given the local weather determined by the weather module 52. In some cases one or more of these contextual data sources may be used to augment or refine an ambient light reading detected by light sensors on the portable electronic device.

Next, at 608, a display-ready image is received from a program, file store, on-board camera, or other source. The display-ready image may have been previously adapted to a standard illuminant—e.g., D65 having a white point of approximately 6500K.

Next, at 610, it is determined whether an ambient light matching mode is activated, which may be the ambient light matching mode activated by a user in FIG. 5 and encoded in mode settings 44 of FIG. 4. If the ambient light matching mode is activated (Y), the method proceeds to 612. If the ambient light matching mode is not activated (N), the method proceeds to 618.

At 612, it is determined whether a new white point of the ambient light has been recorded in a recent portion of the ambient light history. The recent portion of the ambient light history may be a first predetermined time period extending from the most recently collected ambient light data (e.g., ambient light data received at 602) to any suitable previous time in the ambient light history. The previous time to which the recent portion extends may be chosen such that ephemeral changes in ambient white point do not cause inappropriate and disorienting display and/or image adjustments— for example, a time period spanning 30 seconds or one minute. Further, changes below a threshold value in ambient white point in the recent portion of the ambient light history may be ignored for the same reason. Since the extent to which the human visual system perceives changes in brightness depends on the brightness level itself, this threshold value may be a proportional, scaled threshold adapted to the brightness recorded in the recent portion of the ambient light history. For example, the threshold value may be set to a relatively lower value in dim ambient light as changes in brightness in these conditions are more easily perceptible. Conversely, the threshold value may be set to a relatively higher valve in bright ambient light as changes in brightness in these conditions are less perceptible. If a new white point has been recorded in the recent portion of the ambient light history (Y), the method proceeds to 614. If a new white point has not been recorded in the recent portion of the ambient light history (N), the method proceeds to 618.

At 614, the display-ready image received at 608 is color-shifted based on the ambient light history and particularly based on the recent portion of the ambient light history. As described above, at least a subset of pixels in the display-ready image may be color-shifted, and in most scenarios, substantially all of the pixels of the image may be color-shifted. As one non-limiting example, a new white point may be detected in a recent portion of ambient light history which indicates that the portable electronic device is in an environment which is lit by a substantially orange light. An image displayed on the portable electronic device may be color-shifted in this example by determining the difference between the image's white point, 6500K and the white point of the light source, e.g. 2800K. The image would be shifted to the ambient white point so that all colors in the image continue to appear vivid, accurate, and easily perceptible in the environment. Methods for image white point shifting are well known in color science, with one exemplary method described below with reference to FIG. 12.

Next, at 616, one or more display settings associated with the display (e.g., display 12 of FIG. 4) of the portable electronic device are adjusted. As described above, such adjustments may include adjusting the gamma curves and backlight output level associated with the display. The backlight level may be altered based on image content evaluation per well-known content-adaptive backlight control (CABC) algorithms. CABC algorithms serve to optimize the backlight level for minimum battery consumption based on image tonal range. The gamma curves associated with the display may be adjusted by modifying or selecting one or more gamma curves associated with the display, for example, where a given gamma curve may take the form of a power function whose power is determined by the gamma level. This may be done to maintain visibility of darker tones that might otherwise be lost due to surface glare in bright environments.

Next, at 618, it is determined whether a graduated brightness transitions mode is activated, which may be the graduated brightness transitions mode activated by a user in FIG. 5 and encoded in mode settings 44 of FIG. 4. If the graduated brightness transitions mode is activated (Y), the method proceeds to 620. If the graduated brightness transitions mode is not activated (N), the method proceeds to 626.

At 620, it is determined whether a threshold increase or decrease in the brightness of the ambient light has been recorded in a recent portion of the ambient light history. This recent portion may be a second predetermined portion of the ambient light history, in contradistinction to the first predetermined portioned discussed above, although the two may be the same, overlap, or be separated in time. The threshold may be a predetermined proportional value selected to provide responsive display and/or image adaption while preventing unnecessarily frequent adjustments. As described above, indications of the brightness of the ambient light may be recorded in luminance data 25 of FIG. 4, for example. If it is determined that a threshold brightness increase or decrease in the recent portion of the ambient light history has occurred (Y), the method proceeds to 622. If it is determined that a threshold brightness increase or decrease in the recent portion of the ambient light history has not occurred (N), the method proceeds to 626.

At 622, a brightening or dimming pattern appropriate to the increase or decrease, respectively, in the brightness of the ambient light determined at 620 is determined to be applied. Brightening and dimming patterns indicate how the brightness of the display (e.g., display 12 of FIG. 4) of the portable electronic device should be modified for a given change in the brightness of the ambient light according to the second predetermined portion of the ambient light history. Exemplary brightening and dimming patterns are illustrated and described in further detail below with reference to FIGS. 8 and 9.

Next, at 624, the brightness of the display of the portable electronic device is adjusted according to the brightening or dimming pattern determined at 622. The brightness of the display may be adjusted by adjusting the target brightness associated with the display of the portable electronic device. For an OLED display, this target brightness causes an associated display controller to evaluate image content and cause the display to emit light according to the resulting CABC adjustment applied to the target brightness. For an LCD, the target brightness may be provided to an associated backlight brightness controller where the CABC adjustment is added and the result used to drive a backlight brightness that will cause the display brightness to meet the adjusted target.

Finally, at 626, a color-modified image is displayed on the portable electronic device. At least a subset, and in most scenarios, substantially all of the pixels of the display-ready image received at 608 may be modified at 614 to produce the color-modified image. If, in other scenarios, color-shifting is not performed at 614, the display-ready image may be displayed on the portable electronic device at 626 with its color properties unmodified.

FIG. 7 illustrates one example of indications of the white point and brightness of ambient light contained within an ambient light history. On the left in the figure, a plurality of color temperature ranges 700, or bins, is represented (e.g., in the form of CCTs), while a plurality of brightness ranges 701, or bins (e.g., luminance ranges), is shown on the right. Over time, the detected white point and brightness 702 (shown for illustrative purposes as a single combined measurement) of the ambient light sensed by light sensor 20 (FIG. 1) of the portable electronic device 10 is shown to rise. In one embodiment, the adaptive display module 22 of FIG. 4 analyzes the ambient light history to determine whether the ambient white point and brightness has changed from a first range 704 to a second range 706 within the plurality of ranges 700, and whether the ambient white point and brightness remains in the second range for a predetermined time 708. After determining that this has occurred, the adaptive display module 22 adjusts the white point and/or brightness of the display-ready image 28 of FIG. 4 and/or the display 12 of FIG. 1 to representative value(s) (e.g., a white point of 2850K and a display luminance of 200 Cd/m² in the illustrated example) for the second range 706, as shown by a bold dashed line. Likewise, it is detected that the ambient white point and brightness transitions from the second range 706 to a third range 710 for a predetermined period of time 712, and accordingly the white point and/or brightness of the image and/or display is adjusted to representative value(s) for the third range (e.g., a white point of 6500K and a display luminance of 350 Cd/m² in the illustrated example). In this manner, the display is adjusted in a stepwise fashion, and rapid adjustments for short periods of time such as when the ambient white point and brightness of the detected ambient light strayed from the second range for less than the predetermined time period at 714 are ignored to prevent disorienting image and/or display adjustment. It will be appreciated that other patterns in the ambient light history may also be examined and used as a trigger for subsequent white point and/or brightness modifications in the image and/or display. As discussed above, the predetermined period of time 708 and 712 may be within a range of 15 seconds to 1 minute, or longer, and in some embodiments may be about 30 seconds. In other embodiments a smoothing strategy may be employed, such that the adaptive display module 22 reads a detected white point and brightness over a period of time in the ambient light history, and applies a smoothing algorithm thereto, applying a modified white point and/or brightness to an image and/or display as indicated at 716. While the example of FIG. 7 has been described showing both white point and brightness being detected and modified, it will be appreciated that in alternative embodiments only white point may be detected or only brightness may be detected, and the modifications to the displayed image may be made to either white point or brightness instead of both.

To determine a brightening pattern or dimming pattern to apply in the graduated brightness transitions mode of FIG. 5, a visual adaptation rate of the user 5 of FIG. 1 may be estimated based on the ambient light history 26 and one or more ambient light color conditions included therein. "Visual adaptation rate" as used herein refers to the rate at which the visual system for a given user of the portable electronic device 10 adapts to changing light conditions. Visual adaptation may vary significantly for different changes in light conditions; for example, the human visual system may transition from a dark environment to a bright environment in a rapid time frame (e.g., within several seconds), while transitions from a bright environment to a dark environment may comparatively take significantly longer (e.g., several minutes). Perception of the display 12 and images displayed thereon may be optimized by adjusting aspects of the display and/or images based in part on the visual adaptation rate of the user 5 for light transitions recorded in the ambient light history 26. One exemplary formula for computing the human visual system's response time to a difference in luminance is $t=\text{sqrt}(b/(\log(i_0-i_f)-a))$, where t is the time since a change in luminance, a is a constant related to an asymptotic baseline, b is a constant related to the rate of visual system adaptation, $i_0$ is the relatively brighter ambient luminance (e.g., in units of cd/m²), and $i_f$ is the relatively dimmer ambient luminance (e.g., also in units of cd/m²). $i_0$ and $i_f$ may be measurements recorded in temporally separated luminance data 25 in the ambient light history 26, for example.

Figure 8:
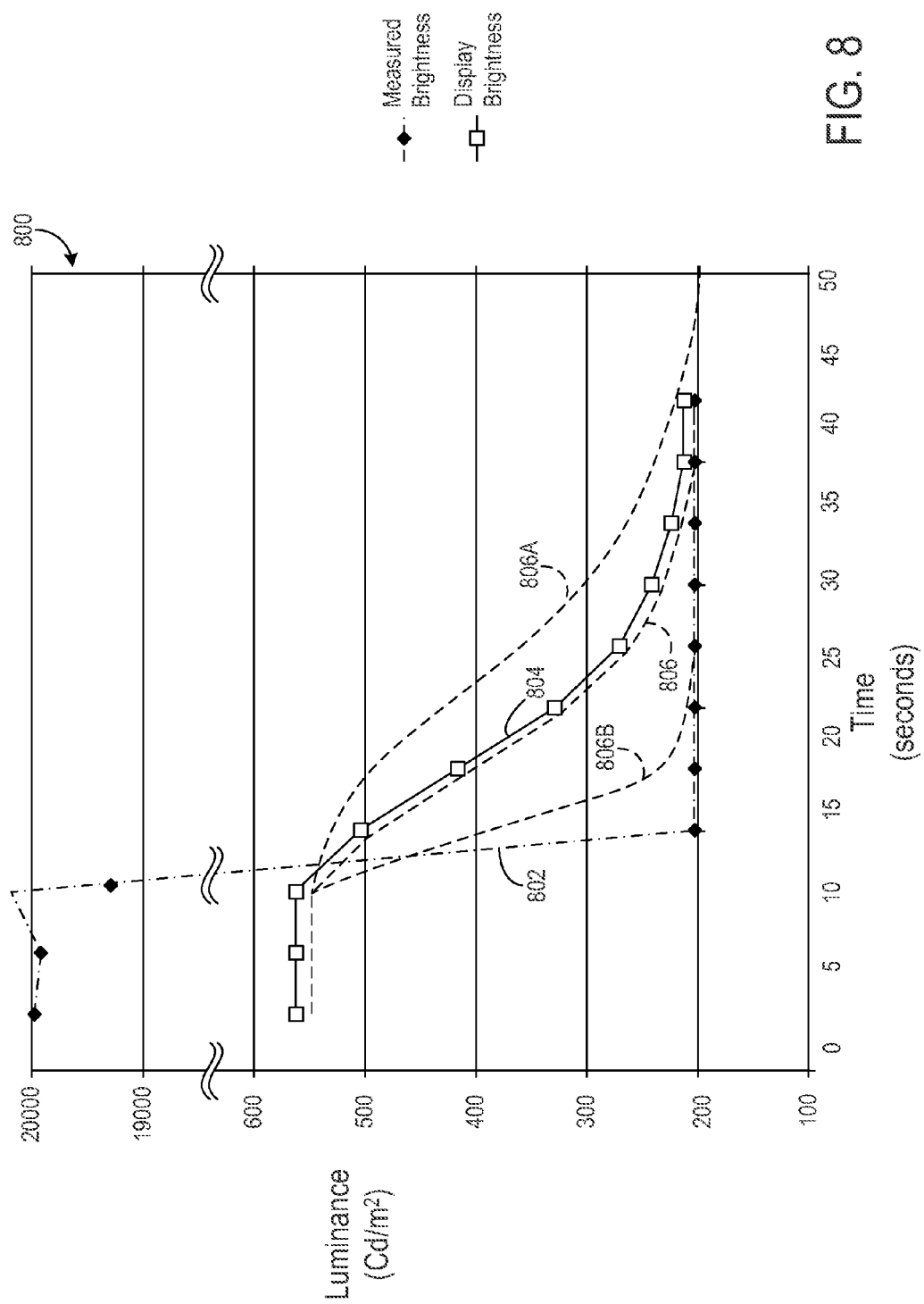
FIG. 8 shows an exemplary dimming scenario.

Turning now to FIG. 8, a graph 800 is shown which plots measured brightness 802 (e.g., measured luminance in units of cd/m²) of ambient light over time for a particular illustrative scenario. The measured brightness 802 may be recorded in the luminance data 25 of the ambient light history 26, for example. More specifically, the measured brightness 802 in this example corresponds to a scenario in which the user 5 of FIG. 1 has been operating the portable electronic device 10 in a bright environment—for example, outdoors in clear daylight. At around the 10 second mark on the graph, the user 5 has begun to enter a building which is comparatively dimly lit. The brightness of this indoor environment is significantly lower than the outdoor brightness and lower than the peak brightness of display 12. Thus, the measured brightness 802 reflects the change as the user traverses a path to a substantially unlit room, reaching this destination at around the 14 second mark, where the user stays for the remaining duration of device operation. It is between the 10 and 14 second mark, for example, that the measured brightness 802 indicates a threshold change in ambient light, prompting application of an appropriate dimming pattern, in the graduated brightness transitions mode of FIG. 5.

Graph 800 also plots the adjusted display brightness 804 of display 12 of the portable electronic device 10 over time, adjusted in response to the measured brightness 802. At the initial portion of this exemplary scenario, measured brightness 802 is determined to be substantially around 20,000 cd/m². Here, the target brightness of display 12 is set to its peak brightness, which may be, for example, substantially between 400 and 500 cd/m² for typical LCDs, or substantially around 300 cd/m² for typical OLED displays. Due to the large disparity between measured brightness 802 and display brightness 804, the luminance (y-axis) of graph 800 is truncated to sufficiently illustrate this exemplary scenario. The display brightness 804 is controlled in this example based on a dimming pattern 806 matched to the ambient light history formulated in this scenario, and in particular to the measured brightness 802 in graph 800.

Generally, the adaptive display module 22 of FIG. 4 may calculate or access pre-calculated values for a plurality of dimming patterns from which a particular dimming pattern may be selected to control aspects of the display 12 (e.g., display brightness, image brightness, etc.). An appropriate dimming pattern may be selected for a particular ambient light context indicated by a portion of an ambient light history. For example, if ambient brightness history indicates the user has been outdoors in the 20,000 cd/m2 ambient for a long interval, the user's photoreceptors will have bleached and will need a longer recovery period. If the user has been in the bright environment for a short interval, photoreceptor bleaching will be incomplete and a shorter recovery period will be required. In the illustrated example, changes in the measured brightness 802 between the 10 and 14 second mark prompts application of dimming pattern 806 in the graduated brightness transitions mode, according to which levels of ambient light decrease over time in a pattern which resembles a decaying exponential function. As a result, the dimming pattern 806 is selected in order to appropriately adjust the display 12, reducing the target brightness from the peak brightness of the display to lower values. The display brightness adjustment rate can be adapted to the inferred photoreceptor state and recovery interval.

A variety of actions may be taken to implement the dimming pattern 806. Such actions may include adjusting the brightness of a backlight of the display 12 if it is an LCD and/or changing the target brightness aim if it is an OLED display or other self-emissive display. These actions cause display-ready image 28 of FIG. 4 to be displayed with reduced brightness or peak luminance of the image itself.

As shown, the dimming pattern 806 causes a reduction in display brightness, as in this example the visual adaptation rate of the user handling the portable electronic device 10 has been accounted for based on the measured brightness 802 tracked over time. By adjusting the display 12 of the portable electronic device 10 in this manner, visual content presented thereon remains clearly perceptible and non-disturbing as the eyes of user 5 adjust to changing ambient light conditions. It will be appreciated that the time required for the rods and cones of the human vision system to adjust to darkness varies with the amount by which the ambient light decreases and the time period during which the decrease occurred. For larger decreases in brightness over a predetermined bright ambient exposure time period, a more gradual dimming pattern 806A may be selected, while for smaller decreases in brightness following the predetermined bright ambient exposure time period, a less gradual dimming pattern 806B may be selected. In this manner, the display 12 may adjust more or less gradually depending on the severity of the darkness transition in the ambient light history. As one example, a decrease of between 350 and 400 Cd/m² in measured brightness throughout a predetermined time period of approximately 10 seconds may prompt selection of dimming pattern that reduces display brightness from its peak brightness (e.g., a peak luminance of 500 Cd/m²) to approximately 350 Cd/m² in about 10 seconds, and to approximately 200 Cd/m² in about 25 seconds. The dimming pattern 806B may be applied for smaller decreases in intensity such as from 100-50 Cd/m² in 0-4 seconds. The longer decay rates of these dimming patterns aid the perception of the user 5 of the display 12 as the rods continue to adjust to the dark environment. In some examples, modification of display brightness may occur when it is determined that the visual system of a typical user has adapted to brightness levels approximately twice that of the peak brightness of the display in use.

Figure 9:
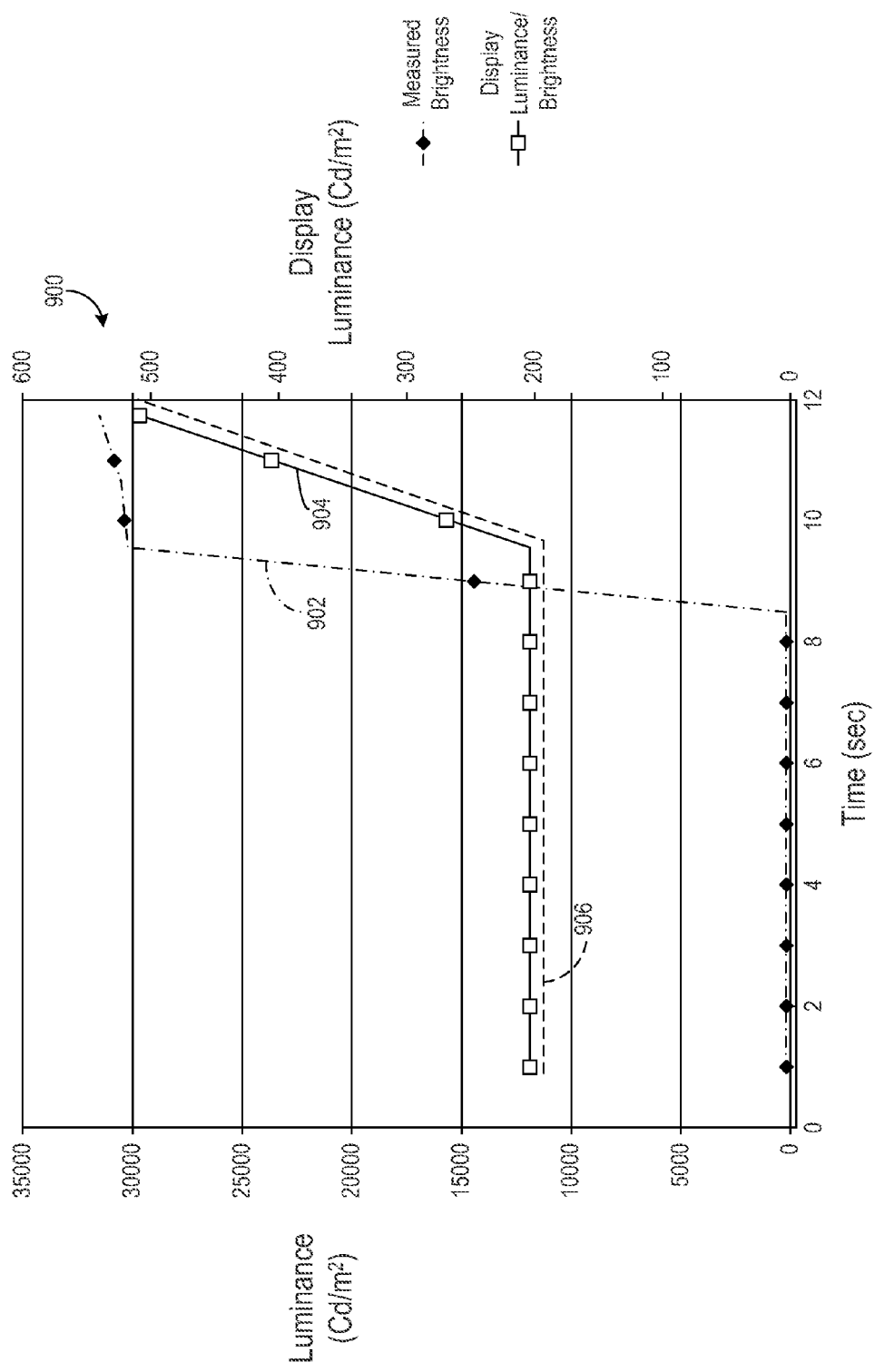
FIG. 9 shows an exemplary brightening scenario.

Turning now to FIG. 9, a graph 900 is shown, which plots measured brightness 902, display brightness 904, and a corresponding brightening pattern 906 for an exemplary scenario in which the brightness of ambient light rapidly and significantly increases. Graph 900 may correspond to a scenario in which a user opens a door to and enters a bright, outdoor environment lit by clear daylight from a substantially unlit room, for example. Here, the measured brightness 902 changes rapidly on the order of seconds. While the visual adaptation rate of the user 5 manipulating the portable electronic device 10 is accounted for, this adaptation rate is significantly greater when entering a bright environment from a dim environment, as opposed to entering a dim environment from a bright environment. Accordingly, the brightness of the display 12 is also adjusted on the order of seconds, for example by adjusting its backlight. In the depicted example, a brightening pattern that increases display brightness (e.g., luminance) from an indoor level of 50 Cd/m² to reach a level of about 500 Cd/m² The increased display luminance is applied when an increase in a range of between about 50-150 Cd/m² is detected in a predetermined time period of between 0 and 10 seconds. Even more rapid brightening patterns may be implemented for smaller increases in ambient brightness.

It will be appreciated that graphs 800 and 900 shown respectively in FIGS. 8 and 9 are provided as illustrative examples and are not intended to be limiting in any way. The number and temporal density of data points illustrated in these graphs are schematically illustrative and may not be drawn to exact scale. Further, such data points are connected to form continuous graphs merely for the sake of illustration.

Figure 10:
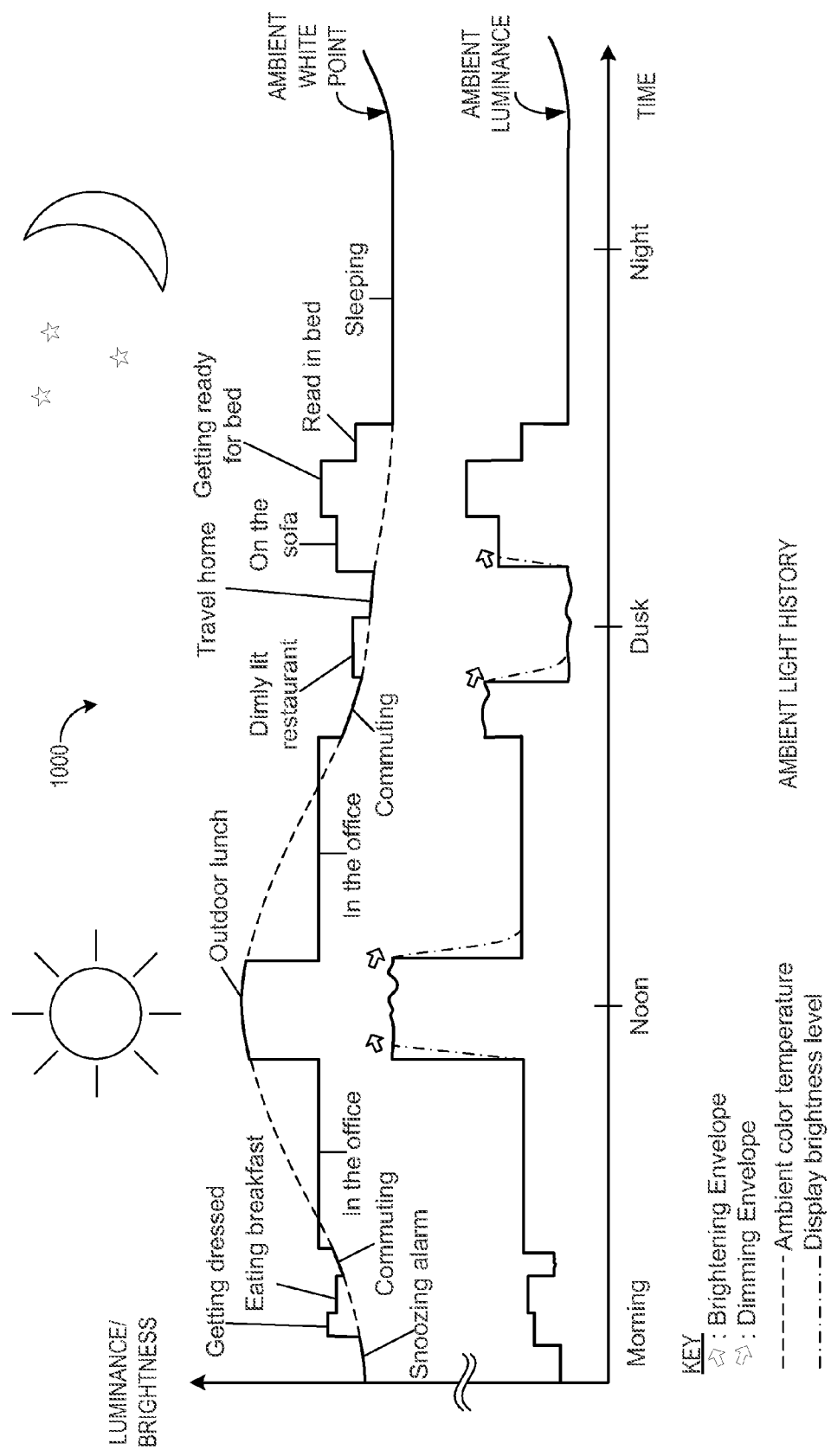
FIG. 10 shows an exemplary use case scenario of the portable electronic device of FIG. 1.

FIG. 10 illustrates an example use case scenario for the portable electronic device 10 of FIG. 1 throughout a typical day of the user 5, with a graph 1000 of both ambient luminance and ambient white point plotted, for example, as cd/m² and CCT values respectively against time. As shown, the user begins the day by hitting snooze on his alarm on the device 10, dawn breaks, and the ambient light sensor detects an increasing color temperature of the white point in the ambient light. Accordingly, the white point of the display 12 of the portable electronic device 10 is adjusted to match. As the user 5 gets dressed in one fluorescent light environment, and eats breakfast in another incandescent light environment, the display white point is adjusted to match again. The user commutes to work and the white point of the display is adjusted to match the sunlight streaming in the car's windows. The color temperature of ambient light throughout the day is shown in the figure in dashed lines when the display is not adjusted to match ambient light. As the user arrives at the office, the device 10 transitions its display white point to match the fluorescent lights of the office, and remains at that white point throughout out the day, except for lunch, when the display is adjusted to match the white point of midday sun.

As the user emerges into the midday sun from the office, the sudden spike in brightness triggers a brightening pattern such as brightening pattern 906 illustrated in FIG. 9, and as the user 5 returns from the bright sun to the dim office after lunch, a sudden decrease in ambient luminance triggers a dimming pattern, such as dimming pattern 806 shown in FIG. 8. The user 5 commutes home before dusk, and eats dinner at a dimly lit restaurant. A dimming pattern is applied upon entry to the restaurant. The user 5 travels home in the twilight, and enters his home. A brightening pattern is applied to the display as the user 5 turns on the incandescent lights in his home. The display in turn adjusts to the fluorescent lights of the user's changing room environment, and the bedside table lighting prior to the user falling asleep. Towards the end of the day and in the morning, when the device is exposed to sunlight or incandescent light, the white point is shifted toward the red portion of the spectrum, with a white point of 2000K or 2850K, for example, and the display 12 is generally dimmed due to the relatively low brightness of the ambient light during these times. This aids the user 5 not only in more easily perceiving the displayed images on the device 10, but also in both waking up and falling asleep.

Other modes may be utilized to provide display of context-sensitive images and visual content. A time zone shift mode may be used and selected by the user 5 in advance (e.g., several days beforehand) of a trip to another location having a time zone differing from that of the user's current location. The use of this mode may help mitigate adverse effects inherent to travelling, such as jet lag, as the output of a display may affect melatonin production and sleep patterns in users.

A sleep mode may also be activated if an inactivity threshold is reached. For example, the device 10 may track the time since user input was received to control entry to the sleep mode, and alternatively or additionally may utilize accelerometer data from an accelerometer to determine the length of time since the user 5 has physically manipulated the device. Should the inactivity threshold be exceeded, various actions may be taken including reducing the brightness and/or white point of the display 12 as described above.

While the example shown in FIG. 10 depicts an ambient light history spanning substantially the entirety of a single day, it will be appreciated that the temporal duration of an ambient light history may be a lengthy duration that is sufficient to record the physiological changes in the human vision system that affect a user's perception of the display. As non-limiting examples, a minimum duration may be established for an ambient light history. In one preferred embodiment, the duration of the ambient light history is at least 45 minutes, which helps capture changes which affect the full adjustment of the human vision system. Of course, longer periods may be used as well, such as at least an hour. In other embodiments the duration of the ambient light history may be a shorter duration that still captures many of the changes that affect the human vision system's adaptations, such as at least 20 minutes. In yet other embodiments even shorter durations may be used, such as at least 10 minutes.

Figure 11:
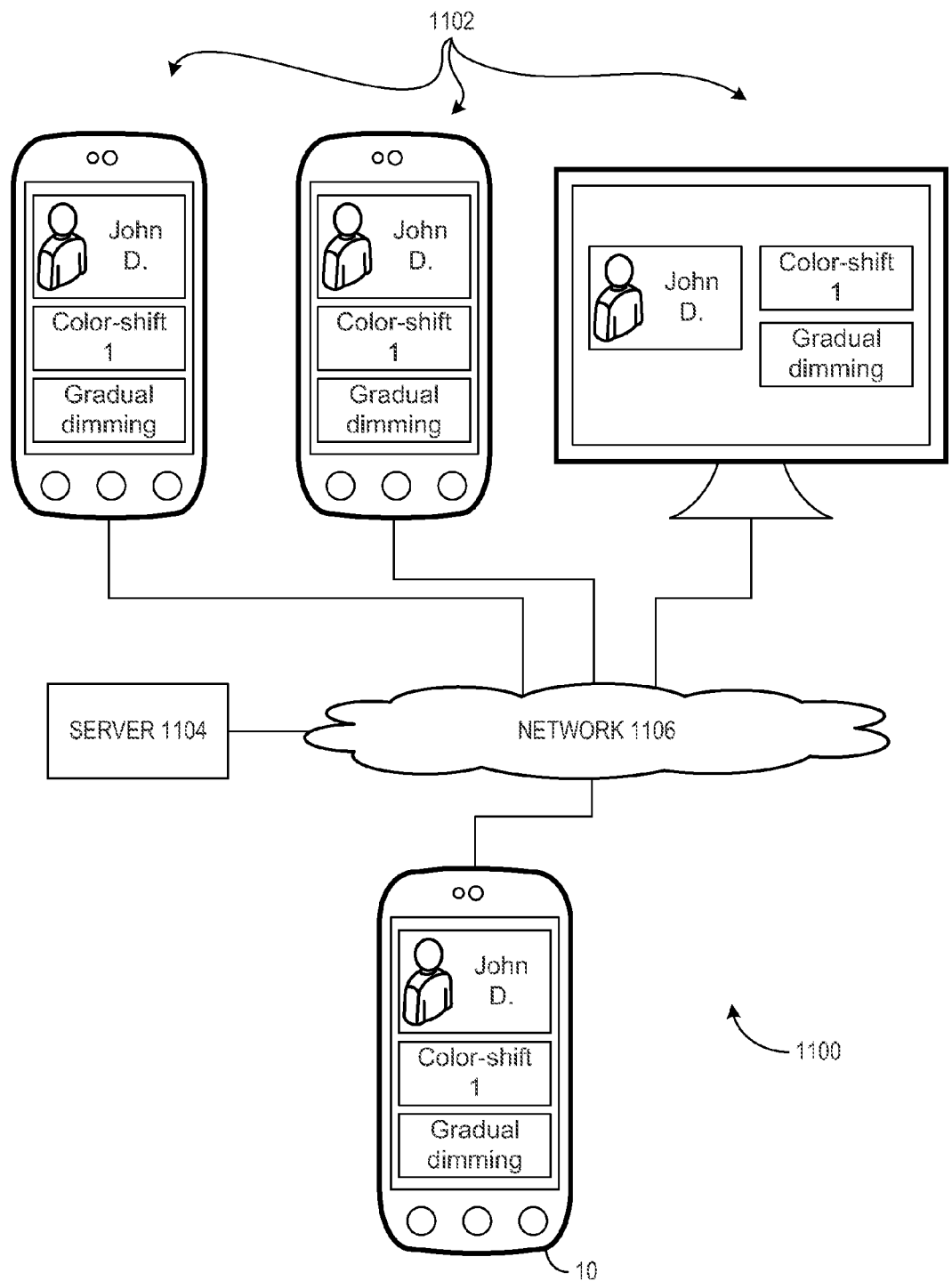
FIG. 11 shows an example of display color-modification via network transmission of user profile data.

FIG. 11 illustrates an embodiment of a system 1100 for sharing ambient light history, contextual data, mode settings, and other data from portable electronic device 10 to other computing devices 1102 used by a user, to enable a consistent display experience among devices in an ambient light context-aware manner. To enable this, portable electronic device 10 is configured to transmit as user profile data various data used to modify a displayed image on the portable electronic device, including ambient light history 26, mode settings 44, contextual data 54, modified display settings 40, etc., from the portable electronic device 10 to one or more of the other computing devices 1102 each having associated displays. This transfer may occur in response to the user logging in to one of the other computing devices after using portable electronic device 10, or upon a wireless connection (WIFI, BLUETOOTH, etc.) being established among one or more of these other devices and the portable electronic device 10.

To facilitate the transfer of user profile data, a server 1104 may be provided that is configured to periodically receive the user profile information from the portable computing device 10, and upload the user profile information to one or more of the other computing devices 1102. The user profile information may be shared via a network 1106 to which portable electronic device 10, server 1104, and computing devices 1102 may be commonly connected, which may be a wireless or wired communications link, such as a BLUETOOTH, WIFI, or ETHERNET link, for example. Alternatively, the portable electronic device 10 may directly communicate the user profile information to one or more of the other computing devices 1102 via suitable wireless or wired communications links.

Once this information is transmitted from the portable electronic device 10 to one or more of the other computing devices 1102, such computing devices may adjust their displays using the methodologies described above, based on the received ambient light history, mode settings, contextual data, etc., that was used to adjust the display of the portable electronic device. In this way, a smooth transition is enabled for the user among displays, taking into account the user's ambient light history as recorded by the portable electronic device 10. As one example a user may walk to work for 20 minutes while talking on the phone on his portable electronic device, and then enter a dimly lit office environment. As the user begins a user session on his desktop computing device, the user profile data including the ambient light history, mode settings, contextual data, etc. are downloaded by the server 1104, and uploaded to the desktop computing device. In other embodiments, however, server 1104 may periodically download the user profile information from the portable electronic device throughout the duration in which ambient light history is recorded. An adaptive display module, described above, executed on the desktop computing device implements image transforms and modifies the display settings and display ready image to produce a displayed image that takes into account the user's eye adjustment from the bright outdoor environment to the dimly lit office environment. This adjustment is represented in FIG. 11 by the collective application of the same user profile including a common color shift and gradual dimming pattern. Such functionality would be difficult to achieve solely through the desktop computing device alone, but by sharing data regarding the user's ambient light history between the portable electronic device and the desktop computing device, an ambient light context aware display environment can be realized for the desktop computing device and other computing devices 1102.

Turning now to FIG. 12, a flowchart illustrating a method 1200 for adapting the display 12 of FIG. 1 to an ambient white point is shown. In particular, method 1200 illustrates how each pixel in an image having an RGB value may be adjusted according to the ambient white point, thereby adjusting the display 12 on which the image is displayed. While method 1200 is described with reference to device 10 of FIG. 1, it will be appreciated that the method may be implemented on other suitable devices. Method 1200 is described with reference to a single pixel of an image which is display-ready, wherein "display-ready" refers to an image standardized for a white point of approximately 6500K and which has undergone gamma shaping. The process described herein may be repeated for the single pixel, all pixels in an image, or any number of pixels therebetween. The display-ready image may conform to the ITU-B Rec709 standard, for example.

At 1202, CCT readings collected from the ambient light sensor 14 are mapped to x, y coordinates in the standardized CIE color space. A previously determined look-up table may be used to map a given CCT reading to a corresponding pair of CIE x, y coordinates, and in some embodiments, interpolation may be performed to increase the accuracy of the mapping.

At 1204, a set of RGB values (e.g., R, G, B) for a given pixel are scaled such that the scaled RGB values have values between 0 and 1. The RGB values may be respectively scaled, for example by computing (R-16)/219, (G-16)/219, and (B-16)/219, creating a set of scaled RGB values $E_R$, $E_G$, and $E_B$.

At 1206, gamma shaping previously applied to the pixel is removed, which may be a form of linearization. For example, if the scaled $E_R$ value exceeds 0.081, the linear R value $R_{lin}$ is computed via $R_{lin}=((E_R+0.99)/1.099)^{(1/\gamma)}$, where $\gamma$ is defined as 2.2 for a display-ready image. If $E_R$ does not exceed 0.081, $R_{lin}$ is computed via $R_{lin}=(E_R/4.5)$. The linear G and B values may be computed in the same manner.

At 1208, the linear RGB values are converted to CIE X, Y, Z coordinates. This conversion may be computed via a matrix of the following form:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix}$$

The computed CIE Y value is retained for subsequent use. In this way, the luminance of the pixel is preserved while allowing its hue to change.

At 1210, CIE x, y coordinates are computed via the following formulas:

CIE $x=X/(X+Y+Z)$, and CIE $y=Y/(X+Y+Z)$.

At 1212, the difference between the standard white point (e.g., 6500K) and the ambient white point measured via the ambient light sensor 14 is computed to determine a white point correction. The white point correction may be computed by determining the arithmetical difference between CIE x and CIE y coordinates for the standard white point and the ambient white point. The computed correction is then added to the CIE x and CIE y coordinates for every pixel in the image. Should method 1200 be executed iteratively (e.g., applied to more than one pixel), white point correction value determination may only be performed during the initial execution of the method.

At 1214, the CIE x and CIE y coordinates are converted back to CIE X, Y, Z coordinates (X, Y, Z) where X=(CIE x/CIE y)*CIE Y (retained from 1208), and Z=(1−CIE x−CIE y)/CIE y)*CIE Y.

At 1216, the CIE X, Y, Z coordinates are converted back to RGB values in the ITU-B Rec709 color space. This conversion may be computed via a matrix of the following form converting data back to ITU 709 color space:

$$\begin{bmatrix} R709 \\ G709 \\ B709 \end{bmatrix} = \begin{bmatrix} 3.240479 & -1.537150 & -0.498535 \\ -0.969256 & 1.875992 & 0.041556 \\ 0.055648 & -0.204043 & 1.057311 \end{bmatrix} \begin{bmatrix} X \\ Y \\ Z \end{bmatrix}$$

At 1218, gamma shaping removed at 1206 is reapplied by performing the inverse of the computations performed at 1206.

At 1220, the current RGB values (R709, G709, B709) are rescaled by performing the inverse of the computations performed at 1204.

At 1222, it is determined whether there are additional pixels in the image which require color-shifting. If it is determined that there are additional pixels to undergo color-shifting (YES), method 1200 returns to 1204. If all pixels in the image have been color-shifted (NO), method 1200 ends at which a color-modified image (e.g., color-modified image 36 of FIG. 4) comprising a plurality of color-shifted pixels may be outputted to the display 12 of device 10 for viewing.

Method 1200 provides one approach to accomplish the adjustment of white point of the display-ready image 28. In this method, the plurality of pixels in the image is color-shifted by initially specifying a desired white point (e.g., the ambient white point). It will be appreciated, however, that method 1200 may be adapted for other standards, formats, and color spaces, and that the use of CCT, CIE color spaces, the ITU-B Rec709 standard, and RGB pixel values are not intended to be limiting in any way. Further, the computations of method 1200 may be encoded in a look-up table, which may expedite color-shifting to produce a color-modified image for some hardware configurations.

Figure 13:
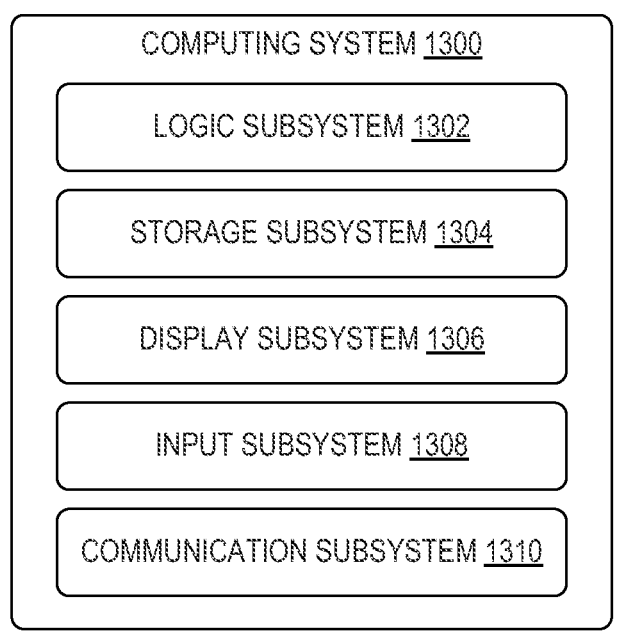
FIG. 13 shows a block diagram of an embodiment of a computing device in accordance with the present disclosure.

FIG. 13 schematically shows a non-limiting embodiment of the hardware components that comprise portable electronic device 10 of FIG. 1, which can enact one or more of the methods and processes described above. Computing system 1300 is shown in simplified form.

Computing system 1300 includes a logic subsystem 1302 and a storage subsystem 1304. Computing system 1300 may optionally include a display subsystem 1306, an input subsystem 1308, and a communication subsystem 1310, and/or other components not shown in FIG. 13.

Logic subsystem 1302 includes one or more physical devices configured to execute instructions. For example, the logic subsystem may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1304 includes one or more physical devices comprising computer-readable storage media configured to hold instructions executable by the logic subsystem to implement the methods and processes described herein. When such methods and processes are implemented, the state of storage subsystem 1304 may be transformed—e.g., to hold different data.

Storage subsystem 1304 may include removable and/or built-in devices. Storage subsystem 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1304 may include volatile, nonvolatile, dynamic, static, read/write, read-only, random-access, sequential-access, location-addressable, file-addressable, and/or content-addressable devices.

It will be appreciated that storage subsystem 1304 includes one or more physical devices and excludes propagating signals per se. However, aspects of the instructions described herein alternatively may be propagated by a communication medium (e.g., an electromagnetic signal, an optical signal, etc.), as opposed to being stored in a computer-readable storage medium.

Aspects of logic subsystem 1302 and storage subsystem 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1300 implemented to perform a particular function. In some cases, a program may be instantiated via logic subsystem 1302 executing instructions held by storage subsystem 1304. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

Display subsystem 1306 may be used to present a visual representation of data held by storage subsystem 1304. As the herein described methods and processes change the data held by the storage machine, and thus transform the state of the storage machine, the state of display subsystem 1306 may likewise be transformed to visually represent changes in the underlying data. Display subsystem 1306 may include one or more display devices utilizing virtually any type of technology, including but not limited to the display 12 of FIG. 1. Such display devices may be combined with logic subsystem 1302 and/or storage subsystem 1304 in a shared enclosure, or such display devices may be peripheral display devices.

Display 12 of display subsystem 1306 may be of various suitable types including but not limited to a liquid crystal display (LCD), organic light-emitting diode (OLED) display, etc. The display includes a plurality of pixels that emit or transmit light in a range of colors to produce visual content. Each pixel of the plurality of pixels may include an array of subpixels—for example, a red subpixel, a green subpixel, and a blue subpixel which each emit or transmit light substantially over a wavelength range. The amount of light emitted by each subpixel in a given array may be controlled such that a pixel comprising the array may reproduce a given perceptual color in a given color spectrum. Display 12 may be a touch screen configured to sense touch input from digits of a user, a stylus, or other input device which may be interpreted to control various aspects of device 10 and programs running thereon. As two examples, display 12 may incorporate a resistive or capacitive touch screen. Display 12 may further incorporate a suitable antireflective coating to reduce glare and improve the quality of the display.

Each pixel in display 12 is individually addressable and drivable to produce a desired color and intensity. The color for a pixel may be represented in one of many color notation systems for computer graphics, including RGB, HSV, HSL CMYK, etc. A plurality of aspects may be associated with each pixel in display 12 and the overall display itself. Aspects associated with each pixel may include a color and a brightness level (e.g., saturation, luminance, etc.) whose values may be separately or collectively encoded in any suitable format by device 10, for example via an RGB value.

"White point" as used herein refers to the color defined as white as applied to an image, display, or ambient environment. White point may be measured in various suitable manners, including in the form of a correlated color temperature (CCT), which is defined as the temperature of a blackbody radiator whose color best matches the color of a light source under certain viewing conditions. The white point of a display is frequently set according to the standard illuminant D65, which is an approximation of average daylight corresponding to a CCT of approximately 6500K. In some conditions, the white point of display 12 may be initially set to 6500K and subsequently adjusted based on ambient light conditions surrounding the display as described in further detail below.

"Color reproduction" as used herein refers to the gamut of colors which may be reproduced given a set of primary colors. In this example, the color reproduction of the display 12 of FIG. 1 is determined substantially based on its primary colors (e.g., red, green, blue) provided by the subpixels in each pixel array.

"Gamma level" as used herein generally refers to an exponent that shapes the image's contrast. More precisely, gamma level may refer to the value assumed by γ in the following relation: $V_{out}=C*(V_{in})^\gamma$, where C is a constant, $V_{in}$ is a brightness of a pixel or subpixel of an input image, and $V_{out}$ is a corresponding brightness of a pixel or subpixel of an output image. This relation may be used to form one or more gamma curves for a given gamma level and range of inputs and outputs. The gamma curves may in turn be used to pre-compute look-up tables and/or adjusted transfer functions with which gamma correction may be performed to control display contrast.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

While the above described illustrative embodiments reference a portable computing device, it will be appreciated that the concepts disclosed herein may be suitable for application to televisions and personal computers that are not portable, and which are configured to sense ambient light and store it in an ambient light history, and perform the color shifting and brightness adjustments discussed herein.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A portable electronic device comprising:
   a display;
   a light sensor configured to sense an ambient light color condition;
   a processor configured to:
      determine an ambient light history including a plurality of ambient light color conditions, including a plurality of correlated color temperatures and luminance data, sensed over a duration of device operation by a light sensor;
      read a display-ready image from an image source, the display-ready image having a plurality of pixels;
      adjust a manner in which the display-ready image is displayed on the portable electronic device by color-shifting at least a subset of the plurality of pixels based on the plurality of ambient light color conditions in the ambient light history to thereby generate a color-modified image, wherein color-shifting the subset of the plurality of pixels includes adjusting white points of the subset of the plurality of pixels;
      display the color-modified image on the display of the portable electronic device;
      detect a threshold brightness decrease during a predetermined time period based on the luminance data in the ambient light history; and
      apply a dimming pattern with a target brightness that varies with time to effect a graduated dimming of the brightness of the display over a predetermined time in response to the detection of the threshold brightness decrease.

2. The portable electronic device of claim 1, wherein the light sensor is an ambient light sensor configured to detect a luminance.

3. The portable electronic device of claim 1, wherein the light sensor is a camera.

4. The portable electronic device of claim 3,
   wherein the camera is a front camera, the portable electronic device further comprising a rear camera configured to capture ambient light; and
   wherein the processor is configured to determine the ambient light history including the plurality of ambient light color conditions sensed over the duration of device operation by both the front and the rear camera to determine the ambient light history.

5. The portable electronic device of claim 1,
   wherein the plurality of ambient color conditions includes a white point.

6. The portable electronic device of claim 1, the processor further configured to:
   detect a threshold brightness increase during a predetermined time period based on the luminance data in the ambient light history; and
   apply a brightening pattern with a target brightness that varies with time to effect a graduated brightening of the brightness of the display over a predetermined time in response to the detection of the threshold brightness increase;
   wherein the brightening pattern increases the brightness at a faster rate than the dimming pattern decreases the brightness.

7. The portable electronic device of claim 1,
   wherein the image source includes an associated display pipeline from which the display-ready image is read; and
   wherein color-shifting at least the subset of the plurality of pixels occurs after the display-ready image is read from the associated display pipeline of the image source.

8. The portable electronic device of claim 1, wherein the processor is configured to modify a gamma curve and/or background brightness level associated with the display to adjust the manner in which the display-ready image is displayed.

9. The portable electronic device of claim 1, wherein the processor is configured to modify color reproduction and/or peak luminance associated with the display-ready image to adjust the manner in which the display-ready image is displayed.

10. The portable electronic device of claim 1, where the processor is further configured to:
    transmit user profile data including the ambient light history, mode settings, and/or contextual data to one or more other computing devices each having a display to enable images displayed on the one or more other computing devices to be color-modified based on the transmitted user profile data.

11. A portable electronic device, comprising:
    a display;
    a light sensor configured to sense an ambient light color condition;
    a processor configured to execute an adaptive display module, the adaptive display module configured to:
       determine an ambient light history including a plurality of ambient light color conditions, including a plurality of correlated color temperatures and luminance data, sensed over a duration of device operation by the light sensor;

read a display-ready image from an image source, the display-ready image having a plurality of pixels;

adjust a manner in which the display-ready image is displayed on the portable electronic device by color-shifting at least a subset of the plurality of pixels based on the plurality of ambient light color conditions in the ambient light history to thereby generate a color-modified image, wherein color-shifting the subset of the plurality of pixels includes adjusting white points of the subset of the plurality of pixels;

display the color-modified image on the display;

detect a threshold brightness decrease during a predetermined time period based on the luminance data in the ambient light history; and apply a dimming pattern with a target brightness that varies with time to effect a graduated dimming of the brightness of the display over a predetermined time in response to the detection of the threshold brightness decrease.

12. The portable electronic device of claim 11, wherein the light sensor is an ambient light sensor configured to detect a luminance.

13. The portable electronic device of claim 11, wherein the light sensor is a camera.

14. The portable electronic device of claim 13,
wherein the camera is a front camera, the portable electronic device further comprising a rear camera configured to configured to capture ambient light; and
wherein the ambient light history includes a plurality of ambient light color conditions sensed over a duration of device operation by both the front camera and the rear camera.

15. The portable electronic device of claim 11,
wherein the plurality of ambient light color conditions includes a white point.

16. The portable electronic device of claim 11,
wherein the adaptive display module is configured to determine a display brightness change responsive to the luminance data; and wherein the adaptive display module is configured to detect a threshold brightness increase during a predetermined time period based on the luminance data in the ambient light history, and apply a brightening pattern with a target brightness that varies with time to effect a graduated brightening of the brightness of the display over a predetermined time;

wherein the brightening pattern increases the brightness at a faster rate than the dimming pattern decreases the brightness.

17. The portable electronic device of claim 11, wherein the ambient light history has a temporal duration of at least ten minutes.

18. A method for adjusting a display to account for ambient light, the method comprising:

at a portable electronic device:

receiving ambient light data from an ambient light sensor, the ambient light data including ambient color data indicating an ambient light condition external to the portable electronic device and luminance data;

receiving contextual data from a contextual data source;

reading a display-ready image from an image source, the display-ready image having a plurality of pixels;

modifying one or more properties of at least a subset of the plurality of pixels based on at least the ambient light data and the contextual data;

displaying the modified display-ready image on the display;

detecting a threshold brightness decrease during a predetermined time period based on the luminance data; and applying a dimming pattern with a target brightness that varies with time to effect a graduated dimming of the brightness of the display over a predetermined time in response to the detecting of the threshold brightness decrease.

* * * * *